United States Patent [19]

McNesby et al.

[11] Patent Number: 5,235,603
[45] Date of Patent: Aug. 10, 1993

[54] SYSTEM FOR DETERMINING LOSS OF ACTIVITY ON A PLURALITY OF DATA LINES

[75] Inventors: John B. McNesby, Mesa, Ariz.; David C. Crohn, Munich, Fed. Rep. of Germany

[73] Assignee: Siemens Aktiengesellschaft, Berlin and Munich, Fed. Rep. of Germany

[21] Appl. No.: 618,143

[22] Filed: Nov. 26, 1990

[51] Int. Cl.⁵ .......................... G06F 1/04; G06F 11/20
[52] U.S. Cl. ......................................... 371/62; 371/61; 371/57.1
[58] Field of Search ........................... 371/62, 57.1, 61

[56] References Cited

U.S. PATENT DOCUMENTS

| | | | |
|---|---|---|---|
| 3,772,649 | 11/1973 | Haselwood | 340/146.1 |
| 3,893,617 | 7/1975 | Solberg | 371/62 |
| 4,020,460 | 4/1977 | Jones et al. | 371/57.1 |
| 4,298,982 | 11/1981 | Auerbach | 371/30 |
| 4,556,947 | 12/1985 | Prioste et al. | 371/62 |
| 4,658,399 | 4/1987 | D'Angio et al. | 371/57.1 |

*Primary Examiner*—Hoa T. Nguyen
*Attorney, Agent, or Firm*—Joseph S. Codispoti; Eugene S. Indyk

[57] ABSTRACT

A system for determining the presence or absence of data on one or more data lines including a flip-flop for each data line with the output of each flip-flop connected to a NAND gate. The NAND gate is connected through an OR gate to two output flip-flops in series. The logic of the system is such that the output of the second of the two output flip-flops provides a signal level which is high or low depending on whether data is present on all of the data lines or one or more lines has no data.

4 Claims, 2 Drawing Sheets

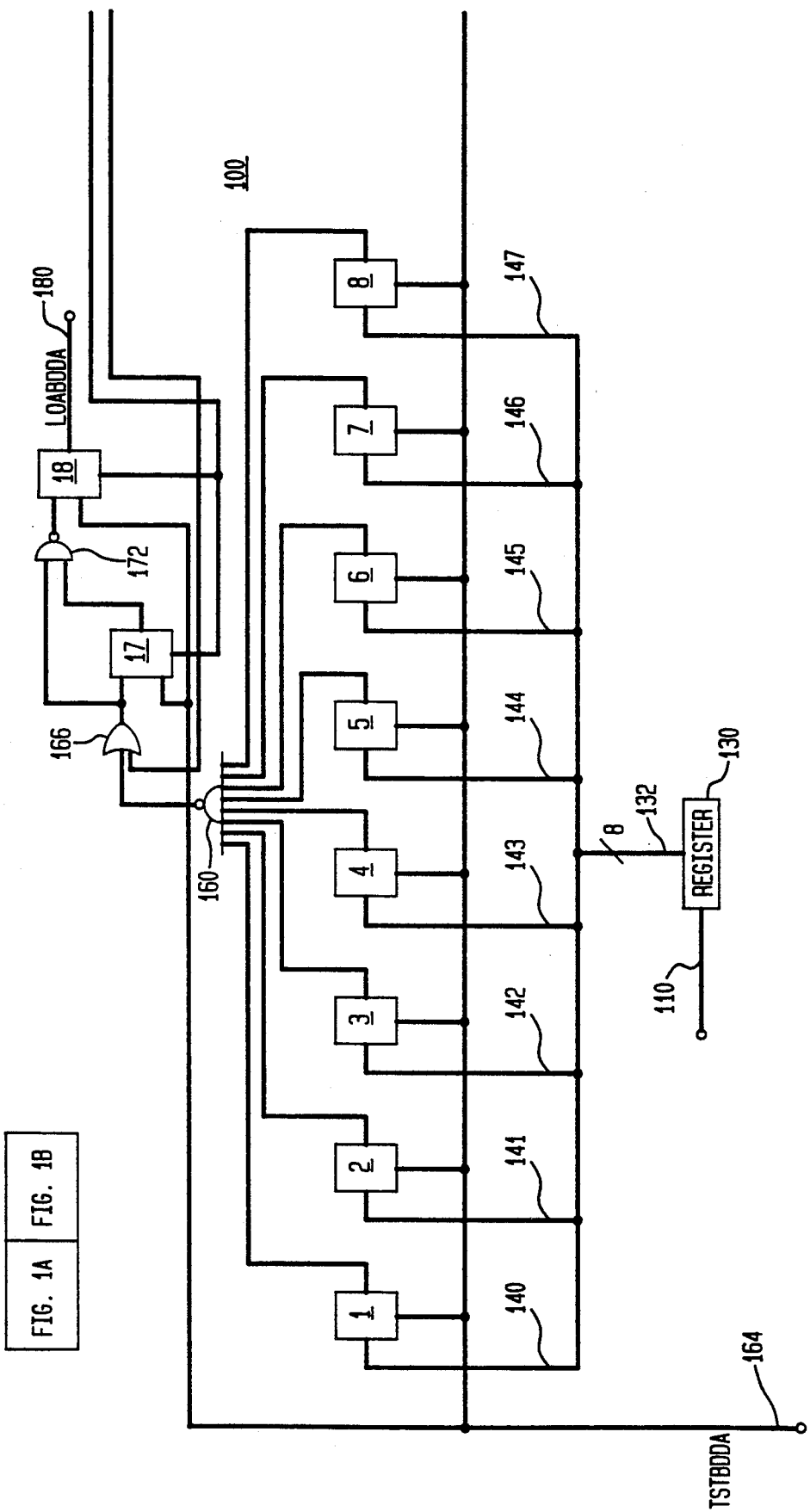

SYSTEM FOR DETERMINING LOSS OF ACTIVITY ON A PLURALITY OF DATA LINES

BACKGROUND OF THE INVENTION

This invention relates to digital communications systems wherein multiple data lines are coupled to various circuit modules and, more particularly, to an arrangement for determining the presence or absence of signals on each data line.

The communications industry requires reliable operation over long periods of time and to this end, reliable self diagnostic equipment or circuits are required to monitor the validity of data entering and leaving functional blocks. Circuits and systems are known for determining the presence or absence of data on transmission lines. However, such known circuits utilize large numbers of circuit modules and the resulting systems are undesirably complex and expensive.

Accordingly, it is a primary object of this invention to provide an improved system and circuit for determining the presence or absence of data on transmission lines.

Another object of this invention is to provide an improved system for sensing data on transmission lines with an economy in the number of circuit elements and power required in the system.

SUMMARY OF THE INVENTION

The foregoing, and additional, objects are attained in accordance with the principles of this invention by providing a relatively simple and efficient system and circuitry, operating in parallel mode, for detecting loss of activity on eight or sixteen input data lines in circuit modules. The system of the invention receives data on eight or sixteen lines in parallel and if data is missing from any line, a predetermined logic level appears at the output of a combination of gates and flip-flops.

BRIEF DESCRIPTION OF THE DRAWING

The foregoing will be more readily apparent upon reading the following description in conjunction with the drawing in which the single figure is a schematic representation of a system embodying the invention.

DETAILED DESCRIPTION

Figure 1B:
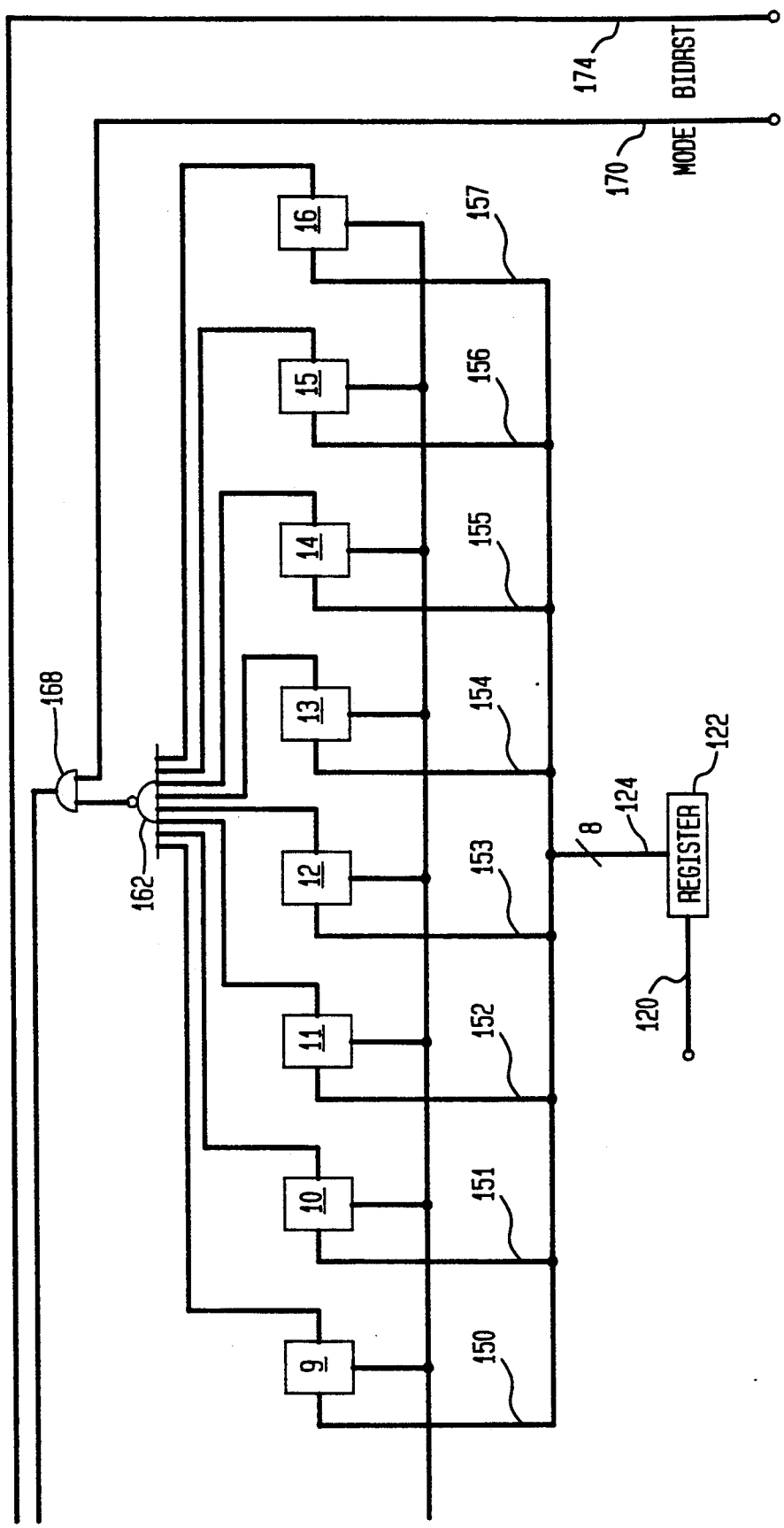

The present invention is usable in a relatively new communication system having a transmission standard known as Synchronous Optical Network (SONET), which is derived from a particular base rate and a format, combined with a multiplexing scheme. This results in a modular family of rates and formats available for use in optical interfaces. The base rate is known as the Synchronous Transport Signal level 1 (STS-1). Each STS-1 frame is a serial bit stream of 810 bytes, with each byte including eight bits. The STS-1 framing is dedicated to the first two bytes of each STS-1 frame. The framing pattern for bytes A1 and A2 is F628 Hex (1111011000101000), where A1 equals F6 Hex (11110110) and A2 equals 28 Hex (00101000). Higher rates (STS-N) in SONET are accomplished by byte interleave multiplexing an N number of STS-1 frames. The framing pattern for an STS-3 frame in an Optical Carrier level 3 (OC-3) system is then A1A1A1A2A2A2. Similarly, the framing pattern for an STS-12 frame in an OC-12 system is twelve A1 bytes followed by twelve A2 bytes.

Referring now to the drawing, the system 100 shown therein is designed in accordance with the principles of this invention to operate in both SONET OC-3 and OC-12 systems although it is applicable to any eight or sixteen or other multi-bit data bus system. The system 100 includes a series of sixteen flip-flops, 1 through 16, to the clock input of each of which a respective input data line is coupled. Data line 110 is coupled through a register 130 to bus 132, from which eight individual leads 140 through 147 run separately to the clock inputs of flip-flops 1 through 8. Data line 120 is coupled through register 122 to bus 124, from which eight data lines 150 through 157 run separately to the clock inputs of flip-flops 9 through 16. The output leads from each of the Q terminals of flip-flops 1 through 8 are coupled to the inputs of NAND gate 160. The output leads from each of the Q terminals of flip-flops 9 through 16 are coupled to the inputs of NAND gate 162.

A lead 164 (TSTBBDA), used to apply a strobe signal periodically to the system 100, is coupled to the reset terminal of each of the flip-flops 1 through 16.

The output of NAND gate 160 is coupled to one input of an OR gate 166. The output of NAND gate 162 is coupled to one input of an AND gate 168, the second input of which is a lead 170 called MODE which selects eight line or sixteen line operation. The output of AND gate 168 is also coupled to OR gate 166. The output of OR gate 166 is connected to the "D" input of flip-flop 17 and to one input of a NAND gate 172, the second input of which comes from the Q output of flip-flop 17. A lead 174 (BIDRST), a source of a power-up reset signal, is coupled to the clock input of flip-flop 17 and to the reset terminal of a flip-flop 18. The output of NAND gate 172 is also coupled to flip-flop 18 and the Q output of flip-flop 18 is lead 180 (LOABDDA).

The logic arrangement of the system 100 is such that a logic low on MODE lead 170 selects activity detection on eight lines and a logic high on the lead 170 selects activity detection on sixteen lines.

The signal on BIDRST lead 174 performs a power-up reset function in which flip-flop 17 is cleared and flip-flop 18 is set. A logic high on the lead 180 (LOABDDA) represents no loss of data activity on any data input line and a logic low or zero on the lead 180 represents a loss of data activity on at least one input data line.

In operation of the system 100, either eight or sixteen data leads are placed in the circuit and the circuit is set for the appropriate number of data leads. When MODE lead 170 is low, AND gate 168 is disabled and its output is low and only data lines 140 through 147 are operative. When the MODE lead 170 is high, AND gate 168 is enabled, the output of NAND gate 162 is connected to OR gate 166 and sixteen data lines are in the circuit. Next, there is a power up reset by means of a signal on lead 174 with the Q output of flip-flop 17 at a logic low and lead 180 (LOABDDA) high.

Once a frame, a signal on lead 164 (TSTBDDA) clears flip-flops 1 to 16, thereby forcing the outputs thereof to a logic zero. In operation of the circuit 100, whenever there is a data transition from low to high on each of the lines which are in operation, e.g., lines 140 to 147, this clocks the logic high on the D input to the Q output of the respective flip-flop 1 through 8. This places a logic high at the input of NAND gate 160 for that flip-flop. When all of the flip-flops have high outputs, the output of the NAND gate 160 goes low. This places a low at the input and output of OR gate 166.

This action places a low at the D input of flip-flop 17 and on one input of NAND gate 172. The Q output of flip-flop 17 is low and the NAND gate 172 thus receives two input lows and its output is high. This high is applied to the D input of flip-flop 18 and puts a high at the Q output of flip-flop 18 and on output lead 180 to represent full data activity on the data input lines when the TSTBDDA signal tests for data activity.

If one of the input lines has no data, the result at the output of flip-flop 18 is a logic low which represents loss of data on a data line.

The logic low on the output lead 180 can be fed to a microprocessor or other control circuit to provide any desired action. Similarly, the logic high representing correct operation can be fed to a microprocessor or other control circuit for follow up action.

In the mode of operation of the circuit 100, the circuit composed of flip-flop 17, NAND gate 172 and flip-flop 18 integrates loss of activity over two strobes on lead 164 (TSTBDDA). A loss of activity interrupt, or other action from a microprocessor or other control circuit, is not propagated until a loss of activity is detected for two consecutive strobes. If any one of the eight, or sixteen, data lines has no activity (a low to high transition), the logic high output of NAND gate 160 and/or NAND gate 162 applied to flip-flop 17 is clocked on the positive edge of the strobe signal and held by flip-flop 17. The strobe signal also clears flip-flops 1 to 16 to reset activity checking on all sixteen data lines. If at the time of the next strobe, there has been no activity on any one, of the sixteen data lines, the logic high held on flip-flop 17 and the logic high output of NAND gate 160 and/or NAND gate 162 will force the output NAND gate 172 low and the strobe will clock the low signal through flip-flop 18. The logic low output of flip-flop 18 on lead 180 represents loss of data on a line, as described above.

Accordingly, there has been described an arrangement for sensing data in a digital communications system wherein data is serially transmitted in frames of multi-bit bytes. While a single embodiment has been disclosed, it will be apparent to those of ordinary skill in the art that various modifications and adaptations to the disclosed arrangement are possible, and it is only intended that this invention be limited by the scope of the appended claims.

We claim:

1. A system for determining the presence or absence of data signals on data input lines in an electronic circuit comprising:
   a plurality of data flip-flops;
   a plurality of data input lines, each coupled to a respective one of said data flip-flops;
   a first gate having a plurality of inputs and an output;
   an output lead from each of said data flip-flops, each said output lead being coupled to a respective input of said first gate;
   a second gate;
   first and second output flip-flops;
   an output lead from said first gate coupled through said second gate to said first output flip-flop;
   a third gate coupled to the output of said second gate, said third gate having a plurality of inputs and an output, one input being connected to the output of said second gate and another input being connected to the output of said first output flip-flop, the output of said third gate being connected to the input of said second output flip-flop; and
   an output lead from said second output flip-flop, said second output flip-flop output lead carrying a first logic level representing the proper operation of all of said data input lines and a second logic level representing loss of activity on at least one of said data input lines;
   wherein the presence of data on all of said data input lines provides:
   a. a logic high through each data flip-flop to the respective inputs of said first gate;
   b. a logic low at the output of said first gate;
   c. a logic low at the input and output of said second gate; and
   d. the output low of said second gate being coupled to said first output flip-flop and said third gate to provide a logic high at the output of said second output flip-flop to represent data activity on all of said data input lines.

2. The system according to claim 1 further including a source of a strobe signal coupled to each of said plurality of data flip-flops and to said first and second output flip-flops to clear all of said flip-flops.

3. The system according to claim 1 further including a lead for coupling a power-up reset signal to said first and second output flip-flops.

4. A system for determining the presence or absence of data signals on data input lines in an electronic circuit comprising:
   a plurality of data flip-flops;
   a plurality of data input lines, each coupled to an input of a respective one of said data flip-flops;
   a first NAND gate having a plurality of inputs and an output;
   an output lead from each of said data flip-flops, each said data flip-flop output lead being coupled to a respective input of said first NAND gate;
   an OR gate;
   first and second output flip-flops;
   an output lead from said first NAND gate coupled through said OR gate to said first output flip-flop;
   a second NAND gate coupled to the output of said OR gate, said second NAND gate having a plurality of inputs and an output, one input being connected to the output of said OR gate and another input being connected to the output of said first output flip-flop, the output of said second NAND gate being connected to the input of said second output flip-flop; and
   an output lead from said second output flip-flop, said second output flip-flop output lead carrying a first logic level representing the proper operation of all of said data input lines and a second logic level representing loss of activity on at least one of said data input lines;
   wherein the presence of data on all of said data input lines provides:
   a. a logic high through each data flip-flop to the respective inputs of said first NAND gate;
   b. a logic low at the output of said first NAND gate;
   c. a logic low at the input and output of said OR gate; and
   d. the output low of said OR gate being coupled to said first output flip-flop and said second NAND gate to provide a logic high at the output of said second output flip-flop to represent data activity on all of said data input lines.

* * * * *